(12) United States Patent
Mumford et al.

(10) Patent No.: US 7,100,577 B2
(45) Date of Patent: Sep. 5, 2006

(54) COMMON RAIL DIRECTLY ACTUATED FUEL INJECTION VALVE WITH A PRESSURIZED HYDRAULIC TRANSMISSION DEVICE AND A METHOD OF OPERATING SAME

(75) Inventors: David Mumford, Vancouver (CA); Richard Ancimer, Vancouver (CA); Mike Baker, Kelowna (CA); Damien Clapa, Vancouver (CA); Richard Wing, Vancouver (CA)

(73) Assignee: Westport Research Inc., Vancouver (CA)

( * ) Notice: Subject to any disclaimer, the term of this patent is extended or adjusted under 35 U.S.C. 154(b) by 262 days.

(21) Appl. No.: 10/867,303

(22) Filed: Jun. 14, 2004

(65) Prior Publication Data

US 2005/0274360 A1   Dec. 15, 2005

(51) Int. Cl.
*F02M 37/04* (2006.01)
*F02M 63/00* (2006.01)

(52) U.S. Cl. ..................................... 123/498; 123/447

(58) Field of Classification Search ................ 123/446, 123/447, 498; 239/533.2, 102.2
See application file for complete search history.

(56) References Cited

U.S. PATENT DOCUMENTS

| | | | |
|---|---|---|---|
| 2,198,850 A | 4/1940 | White | |
| 3,589,345 A * | 6/1971 | Benson | ........................ 123/478 |
| 4,358,663 A | 11/1982 | Sperner et al. | |
| 4,813,601 A | 3/1989 | Schwerdt et al. | |
| 4,909,440 A | 3/1990 | Mitsuyasu et al. | |
| 5,630,550 A | 5/1997 | Kurishige et al. | |
| 5,697,554 A | 12/1997 | Auwaerter et al. | |
| 5,779,149 A | 7/1998 | Hayes, Jr. | |
| 6,062,533 A | 5/2000 | Kappel et al. | |
| 6,076,800 A | 6/2000 | Heinz et al. | |
| 6,079,636 A | 6/2000 | Rembold et al. | |
| 6,298,829 B1 | 10/2001 | Welch et al. | |
| 6,422,208 B1 | 7/2002 | Ertem et al. | |
| 6,464,149 B1 | 10/2002 | Hardy et al. | |
| 6,478,013 B1 | 11/2002 | Boecking | |
| 6,499,471 B1 | 12/2002 | Shen et al. | |
| 6,564,777 B1 | 5/2003 | Rahardja et al. | |
| 6,570,474 B1 | 5/2003 | Czimmek | |
| 6,575,138 B1 | 6/2003 | Welch et al. | |
| 6,584,958 B1 | 7/2003 | Rahardja et al. | |
| 6,637,677 B1 | 10/2003 | Ruehle et al. | |
| 6,651,950 B1 | 11/2003 | Stoecklein et al. | |
| 6,676,030 B1 | 1/2004 | Lorraine et al. | |
| 6,681,999 B1 | 1/2004 | Ruehle et al. | |
| 6,712,047 B1 | 3/2004 | Rueger | |

(Continued)

FOREIGN PATENT DOCUMENTS

JP       01087848 A1    3/1989

(Continued)

*Primary Examiner*—Thomas Moulis
(74) *Attorney, Agent, or Firm*—McAndrews, Held & Malloy, Ltd.

(57) ABSTRACT

A common rail directly actuated fuel injection valve is disclosed with a hydraulic transmission device that is fluidly isolated from the fuel so that the hydraulic fluid can be different from the fuel. This arrangement is particularly suitable for valves that inject a gaseous fuel, but can also be beneficial for use with liquid fuels. According to the method, the hydraulic fluid is pressurizable by the fuel pressure to reduce differential pressures and leakage, in addition to assisting with operation of the hydraulic transmission device. The method further comprises detecting the position of the valve needle for more accurate control of rate of fuel injection during an injection event.

78 Claims, 4 Drawing Sheets

U.S. PATENT DOCUMENTS

| | | |
|---|---|---|
| 2002/0056768 A1 | 5/2002 | Czimmek |
| 2002/0117560 A1 | 8/2002 | Igashira et al. |
| 2003/0226989 A1* | 12/2003 | Cotton et al. .......... 251/129.06 |
| 2004/0031862 A1* | 2/2004 | Eichendorf .............. 239/102.2 |
| 2004/0069874 A1 | 4/2004 | Czimmek |

FOREIGN PATENT DOCUMENTS

| | | |
|---|---|---|
| JP | 2003214280 A1 | 7/2003 |

* cited by examiner

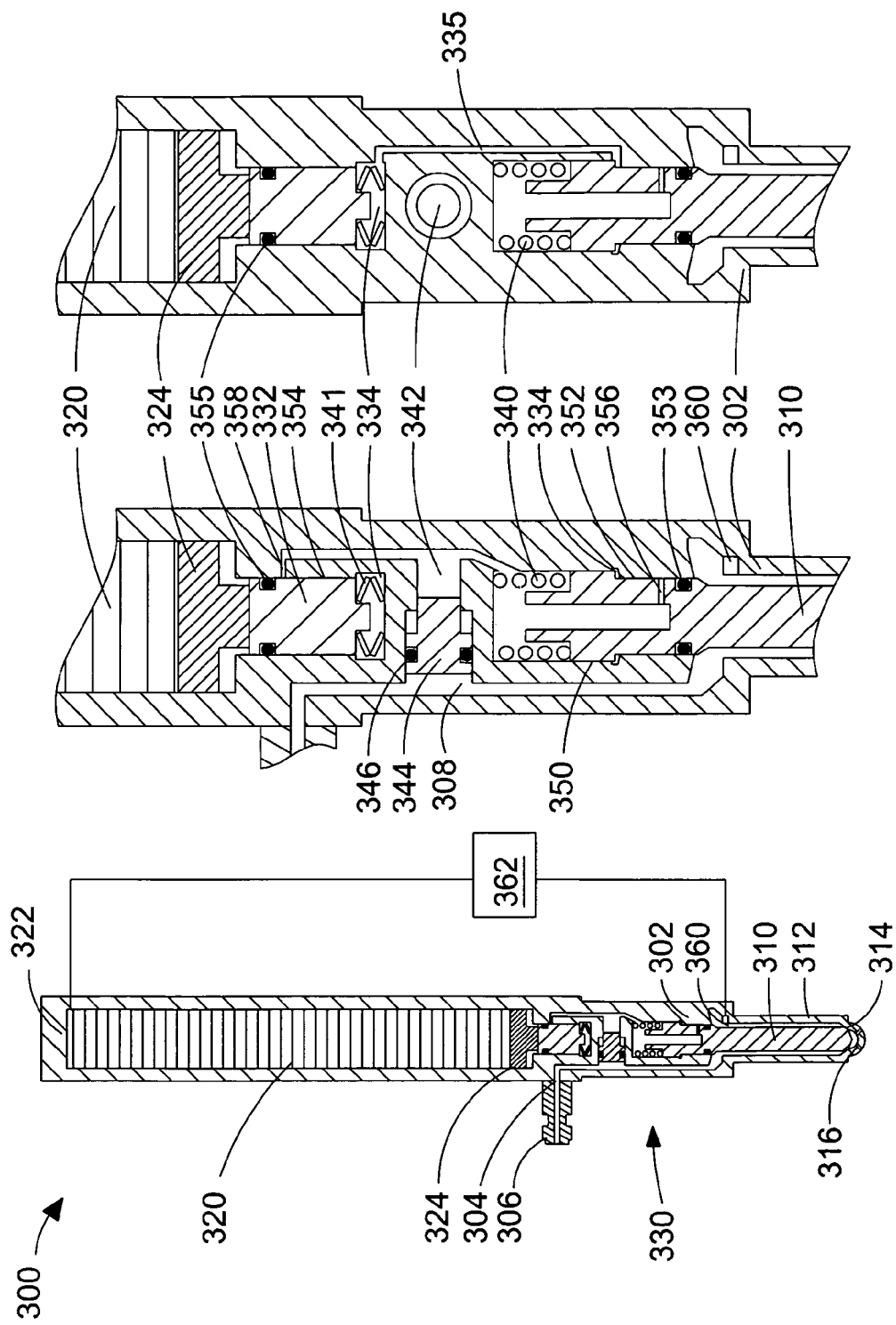

COMMON RAIL DIRECTLY ACTUATED FUEL INJECTION VALVE WITH A PRESSURIZED HYDRAULIC TRANSMISSION DEVICE AND A METHOD OF OPERATING SAME

FIELD OF THE INVENTION

The present invention relates to a common rail directly actuated fuel injection valve with a pressurized hydraulic transmission device and a method of operating such a fuel injection valve. More particularly, the disclosed fuel injection valve employs fuel pressure inside the fuel injection valve to pressurize a fluidly isolated hydraulic fluid, which can be a different fluid from the fuel, making this arrangement particularly suitable for injecting gaseous fuels.

BACKGROUND OF THE INVENTION

Modern diesel engines typically use a common rail fuel system that employs a fuel pump to supply diesel fuel at injection pressure to a plurality of fuel injection valves for injecting the fuel directly into each cylinder. That is, common rail fuel injection valves do not intensify fuel pressure inside the fuel injection valve. An advantage of common rail fuel systems is that fuel pressure and fuel injection events can be controlled independently of engine speed.

Known common rail injection valves are hydraulically actuated, whereby a control chamber filled with hydraulic fluid is used to control valve actuation. Generally, hydraulic fluid is held at pressure in the control chamber to hold the valve in an open or closed position. For example, the pressure of the hydraulic fluid in the control chamber can be employed to hold the valve needle in the closed position, and to open the fuel injection valve a control valve can be operated to drain the hydraulic fluid from the control chamber, allowing the fuel injection valve needle to move to an open position so a fuel injection event can occur. When the control valve is closed, the hydraulic pressure in the control chamber rises and causes the injection valve needle to move to the closed position to end the fuel injection event.

The control valve typically uses a solenoid actuator, but piezoelectric actuators can also be employed, as disclosed by U.S. Pat. Nos. 6,062,533 and 5,779,149.

A disadvantage of hydraulically actuated fuel injection valves is that it is not possible to control the operation of the control valve to move and hold the fuel injection valve needle to an intermediate position between the closed position and the fully open position. Such fuel injection valves use means other than controlling needle lift to influence the fuel mass flow rate into the engine cylinders. For example, some hydraulically actuated fuel injection valves employ spill ports to drain fuel from the nozzle fuel cavity to influence the fuel mass flow rate into the combustion chamber.

Recent developments have been directed at using the mechanical strain produced by piezoelectric, magnetostrictive, or electrostrictive transducers to provide the mechanical movement to directly actuate the position of the injection valve needle. Fuel injection valves of this type are referred to herein as "directly actuated fuel injection valves". Examples of directly actuated fuel injection valves are disclosed in co-owned U.S. Pat. Nos. 6,298,829, 6,564,777, 6,575,138 and 6,584,958. In these injection valves, a strain-type transducer can be activated to convert energy from one form to produce a mechanical strain. That is, a piezoelectric, magnetostrictive, or electrostrictive transducer can be activated to produce a mechanical strain that correlates directly to a corresponding movement of the valve needle.

Some advantages of directly actuated fuel injection valves over hydraulically actuated fuel injection valves include: (a) the high force that strain-type transducers can generate; (b) the substantially instantaneous displacement upon activation; and (c) the flexibility of being able to modulate the mechanical strain by simply modulating the energy applied to the actuator, allowing the valve needle to move to, or be held in, any intermediate position between the closed and fully open positions. For example, if the actuator is a piezoelectric actuator, the amount of mechanical strain can be determined by controlling the charge applied to the piezoelectric material. If the actuator is a magnetostrictive actuator, the amount of mechanical strain can be determined by controlling the strength of the magnetic field applied to the magnetostrictive material. Accordingly, with directly actuated fuel injection valves it is possible to use the actuator to manipulate needle position to control the mass flow rate through the fuel injection valve, allowing more flexibility to control the combustion process to improve combustion efficiency and/or reduce engine emissions.

With piezoelectric, magnetostrictive, and other strain-type actuators, the stroke is generally much smaller than the stroke that can be provided by hydraulic or solenoid actuators. Accordingly, it is known to employ a means for amplifying the stroke of a strain-type actuator. For example, U.S. Pat. No. 5,630,550 discloses a directly actuated fuel injection valve that employs a hydraulic displacement amplifier. The '550 patent discloses an arrangement that fluidly isolates the fluid in the hydraulic displacement amplifier from the fuel, but the fuel pressure is not employed to pressurize the hydraulic fluid. A disadvantage with this arrangement is that there is a greater likelihood of cavitation in the hydraulic displacement amplifier if the movement of the actuator causes the fluid pressure to drop below the fluid's vapor pressure. Another disadvantage is an increased likelihood of leakage into or out from the hydraulic displacement amplifier if there are significant differential pressures across the seals that seal the hydraulic displacement amplifier.

U.S. Pat. No. 4,909,440 discloses a fuel injection valve that comprises a piston actuated by a piezoelectric element. The piston operates on a control chamber that is filled with fuel. A rear face of the piston is subjected to high-pressure fuel to cancel out the forces acting on the piston from fuel pressure residing within the control chamber. The '440 patent claims that this arrangement allows more precise control of the opening and closing of the needle because the piston's movement is not influenced by variations in fuel pressure.

U.S. Pat. Nos. 5,697,554 and 4,813,601 (FIG. 3) disclose directly actuated fuel injection valves that employ piezoelectric actuators and hydraulic displacement amplifiers. The arrangements disclosed by these patents have their fuel cavities fluidly isolated from the hydraulic displacement amplifier system, which includes an amplifier chamber, which, in each case is in restricted fluid communication with a low pressure reservoir via "restrictor gaps". The '601 patent also includes a complicated check valve arrangement for replenishing the hydraulic fluid in the amplifier chamber. In both cases the fuel pressure is not used to influence the fluid pressure in the hydraulic displacement amplifier.

The '554 patent discloses an arrangement whereby hydraulic fluid can flow between the hydraulic displacement amplifier and the low pressure fluid reservoir to compensate for the effects of differential thermal expansion within the fuel injection valve. This feature that can be advantageously incorporated into hydraulic amplification systems. However, thermal and wear effects may not be completely compensated for by such systems and the amplified movement of the injection valve needle may not track the movements of the actuator accurately. To control the movement of a valve needle to follow a predetermined waveform to thereby control fuel mass flow rate and the combustion characteristics, an accurate method of compensating for the thermal and wear effects is needed.

SUMMARY OF THE INVENTION

A common rail directly actuated fuel injection valve comprises:
  (a) a valve body that defines a fuel inlet and a fuel cavity in communication with the fuel inlet;
  (b) a valve member movable within the valve body between a closed position at which the valve member is in sealed contact with a valve seat to hold fuel within the fuel cavity, and at least one open position at which the valve member is spaced apart from the valve seat to allow the fuel to flow from the fuel cavity and out of the fuel injection valve;
  (c) an actuator comprising a drive member that is controllable to produce a mechanical strain in the drive member;
  (d) a reservoir disposed within the valve body and filled with a hydraulic fluid, wherein the reservoir is fluidly sealed from the fuel cavity;
  (e) a hydraulic transmission device associated with the actuator and the valve member, the hydraulic transmission device comprising a transmission cavity filled with the hydraulic fluid for transmitting the mechanical movement from the drive member to the valve member, wherein the transmission cavity is in restricted fluid communication with the reservoir whereby hydraulic fluid can flow between the reservoir and the transmission cavity when the valve member is in the closed position and no substantial hydraulic fluid flows between the reservoir and the transmission cavity when the valve member is in an open position; and
  (f) a pressure regulating device disposed within the valve body between the fuel cavity and the reservoir, whereby hydraulic fluid within the reservoir is pressurizable by fuel pressure within the fuel cavity.

The pressure regulating device preferably comprises a displaceable member disposed between the fuel cavity and the reservoir. The displaceable member can be a piston movable within a cylinder with respective opposite ends of the piston associated with the fuel cavity and the reservoir. A seal can be provided between the piston and the cylinder. The seal can comprise at least one O-ring seal. The piston is movable to ensure that there is a low pressure differential across the seal, so that leakage is reduced and piston movement is generally slow. If the opposite ends of the piston have equal surface areas, then the piston will move to an equilibrium position at which the fluid pressure in the fuel cavity and the reservoir is equal. If, for example, the area of the piston end that is associated with the reservoir is smaller than the area that is associated with the fuel cavity, the piston will move to an equilibrium position at which the fluid pressure in the reservoir is greater than the fuel pressure in the fuel cavity. In this example, such a pressure gradient can help to prevent fuel from leaking into the reservoir and the transmission cavity, but the pressure gradient is preferably kept small to prevent excessive leakage of hydraulic fluid into the fuel cavity.

The fuel injection valve preferably further comprises a sensor associated with the valve member. The sensor is operable to measure the position of the valve member and to send a signal to a controller and wherein the controller is operable to process the signal to determine the difference between the measured position of the valve member and the desired position. The controller can then corrects a command signal to the actuator to move the valve member toward the desired position.

The hydraulic transmission device preferably further comprises a plunger operatively associated with the drive member, wherein the mechanical strain caused by activation of the actuator results in a corresponding movement of the plunger, the plunger having an end that is disposed within the transmission cavity whereby movements of the plunger change the volume of hydraulic fluid that is displaced by the plunger, and wherein the valve member or a transmission member operatively associated with the valve member has an end disposed in the transmission cavity and the valve member or the transmission member is movable to change the volume of hydraulic fluid that is displaced by same, whereby the volume of fluid within the transmission cavity is held substantially constant while the actuator is activated.

In a preferred embodiment at least some of the restricted fluid communication between the reservoir and the transmission cavity is provided by a gap between the plunger and valve member or the transmission member, or a gap between the plunger and the valve body, or a gap between the valve member or the transmission member and the valve body.

If a gap has one end associated with the fluid chambers of the hydraulic transmission device or reservoir and the other end associated with the fuel cavity, a seal can be provided to prevent fluid flow therebetween and a conduit can be disposed within the valve body with an opening into the gap between the seal and the end of the gap associated with the chamber of the hydraulic transmission device or the reservoir. The conduit fluidly connects this opening into the gap with the reservoir so that hydraulic fluid that flows into the gap can be recovered and the pressure acting on the seal does not build.

The plunger can have an end face opposite and equal in area to an end face of the valve member or the transmission member. In this case, there is no amplification of the mechanical strain by the hydraulic transmission device. The two end faces can be disposed in the transmission cavity and spaced apart from each other. With such an arrangement, the hydraulic transmission device provides a hydraulic link through which the mechanical strain is transmitted. The hydraulic transmission device can act as a compensator by changing the spacing between the opposing end faces of the plunger and the transmission member. With this arrangement there is substantially no displacement of hydraulic fluid during an injection event and the hydraulic fluid remains essentially static with there being substantially no hydraulic fluid flow during an injection event.

In another preferred embodiment, the plunger has an area transverse to its direction of movement that defines the volume that is displacable by movement of the plunger that is greater than an area of the valve member or the transmission member that is transverse to its respective direction of movement, and that defines the volume that is displacable by movement of the valve member or the transmission member. In this embodiment, because of the plunger has a larger end area than that of the valve member or transmission member, movement of the plunger results in a larger movement of the valve member, with the amplification ratio being proportional to the difference in areas.

The hydraulic fluid preferably has a bulk modulus that is substantially constant under normal operating conditions within the transmission cavity. Another important property of the hydraulic fluid is its viscosity, which is also preferably substantially constant under normal operating conditions within the transmission cavity and the reservoir.

Because the hydraulic fluid is fluidly isolated from the fuel, the disclosed fuel injection valve is especially suitable for injecting a fuel in the gaseous phase. For example, the gaseous fuel can be selected from the group consisting of natural gas, methane, ethane, liquefied petroleum gas, lighter flammable hydrocarbon derivatives, hydrogen, and blends thereof.

In preferred embodiments the fuel is injectable from the fuel injection valve through a nozzle and directly into a combustion chamber of an internal combustion engine.

The valve member can be an inward or outward opening valve needle depending upon the design of the engine.

The drive member is preferably a transducer that is selected from the group consisting of magnetostrictive, piezoelectric and electrostrictive transducers.

The fluid passages through which the restricted fluid flow is possible are sized to accommodate a flowrate that ensures the transmission cavity is always filled with hydraulic fluid. The volume of the transmission cavity automatically changes to compensate for changes in the dimensional relationship between the actuator and the valve member. Changes in the dimensional relationship may be caused by differential thermal expansion or contraction, wear, and/or variations in assembly and manufacturing within predetermined design tolerances.

A preferred embodiment of the common rail directly actuated fuel injection valve comprises:
  (a) a valve body that defines a fuel inlet, a fuel cavity in communication with the fuel inlet, and a reservoir filled with a hydraulic fluid and wherein the reservoir is fluidly sealed from the fuel cavity;
  (b) a nozzle associated with one end of the valve body;
  (c) a valve member movable within the valve body between a closed position at which the valve member is in contact with a valve seat to prevent fuel from flowing from the fuel cavity through the nozzle, and at least one open position at which the valve member is spaced apart from the valve seat to allow the fuel to flow through the nozzle;
  (d) an actuator comprising a drive member that is controllable to produce a mechanical strain in the drive member; and
  (e) a hydraulic displacement amplifier comprising:
    (1) a plunger operatively associated with the drive member and extendable into an amplification chamber that is filled with a hydraulic fluid; and
    (2) a movable transmission member associated with the valve member and extendable into the amplification chamber, wherein the transmission member has an area transverse to its respective direction of movement that is smaller than an area of the plunger that is transverse to its respective direction of movement and wherein the amplification chamber is in restricted fluid communication with the reservoir whereby hydraulic fluid is flowable between the reservoir and the amplification chamber when the valve member is in the closed position, and because of the relative shortness of the duration of an injection event, no substantial amount of hydraulic fluid is flowable between the reservoir and the amplification chamber when the valve member is in an open position; and
  (f) a pressure regulating device disposed within the valve body between the fuel cavity and the reservoir, whereby hydraulic fluid within the reservoir is pressurizable by fuel pressure within the fuel cavity.

In another preferred embodiment, the common rail directly actuated fuel injection valve comprises:
  (a) a valve body that defines a fuel inlet, a fuel cavity in communication with the fuel inlet;
  (b) a nozzle associated with one end of the valve body;
  (c) a valve member movable within the valve body between a closed position at which the valve member is in contact with a valve seat to prevent fuel from flowing from the fuel cavity through the nozzle, and at least one open position at which the valve member is spaced apart from the valve seat to allow the fuel to flow through the nozzle;
  (d) an actuator comprising a drive member that is controllable to produce a mechanical strain in the drive member;
  (e) a reservoir disposed within the valve body and filled with a hydraulic fluid, wherein the reservoir is fluidly sealed from the fuel cavity.
  (f) a hydraulic displacement amplifier disposed between the valve member and the actuator, the hydraulic displacement amplifier comprising an amplification chamber that is in restricted fluid communication with the reservoir; and
  (g) a pressure regulating device whereby fuel pressure within the fuel cavity can be employed to pressurize hydraulic fluid disposed within the reservoir.

A method of injecting fuel into an engine comprises:
  (a) supplying a fuel at injection pressure to a fuel cavity within a valve body;
  (b) releasing fuel from the fuel cavity by moving a valve member to an open position by activating a strain-type actuator to produce a mechanical strain;
  (c) transmitting a mechanical movement caused by the mechanical strain to a valve member through a hydraulic fluid that is fluidly isolated from the fuel; and
  (d) using fuel pressure within the fuel cavity to pressurize the hydraulic fluid.

In a preferred method the fuel can be supplied to the fuel cavity in the gaseous phase, and the fuel can be selected from the group consisting of natural gas, methane, ethane, liquefied petroleum gas, lighter flammable hydrocarbon derivatives, hydrogen, and blends thereof.

The method can further comprise amplifying the mechanical movement that is caused by the mechanical strain so that the movement of the valve member is greater than the mechanical movement produced by the actuator.

The method preferably further comprises measuring the position of the valve member when the valve member is in the open position. The sensor that takes this measurement sends a signal representative of the measured position to a controller. The method comprises comparing the measured position to a desired position and generating an error signal to correct for the variance therebetween, and processing the error signal to generate a corrected commanded signal, which is sent by the controller to the actuator.

The method can further comprise converting the desired needle position into an open loop command signal with a local map or model, and correcting the open loop command signal with a closed loop command signal that is generated from the error signal. In yet another embodiment, method can further comprises adapting the local map responsive to the error signal.

In a preferred embodiment, the method comprises:
supplying a fuel at injection pressure to a fuel cavity within a valve body;
releasing fuel from the fuel cavity by moving a valve member to an open position by activating a strain-type actuator to produce a mechanical strain;
transmitting a mechanical movement caused by the mechanical strain to the valve member through a transmission device;
measuring a position of the valve member when the valve member is in the open position to determine a measured position and sending a signal representative of the measured position to a controller; and
comparing the measured position to a desired position and generating an error signal that is used by the controller to correct a commanded signal that the controller sends to the actuator.

Fuel injection valves can be operated without measuring needle position during an injection event using open loop control methods. That is, based upon command inputs such as desired load, and measured operating conditions, a command signal can be sent to the injection valve to lift the valve needle for each injection event. For this method, to achieve consistent operation, the fuel injection valve is designed with the objective of providing the same needle lift every time the same signal is sent to the injection valve actuator. A problem with open loop systems like this is that variables are introduced that influence needle position such as, for example, temperature effects, wear, fuel pressure, and combustion chamber pressure. It is more difficult and expensive to manufacture an injection valve that can mechanically compensate for the variable effects that can be encountered by a fuel injection valve during normal operation. For example, hydraulic compensators can be used to compensate for some variability in the dimensional relationship between the components of the fuel injection valve, but this adds cost and complexity to the apparatus. While it remains important for the valve member to respond in generally the same way for a given commanded signal, by employing the disclosed method of measuring the position of the valve member during an injection event, comparing it to the desired position to produce an error signal, and using the error signal to correct a commanded signal that a controller sends to the injection valve actuator, it is not important for the injection valve to be designed to respond in exactly the same manner when the same commanded signal is sent to the actuator. Rather, with the disclosed method, by design, there will be some variability of valve member position for a given commanded signal sent from the injection valve controller to the actuator because the method corrects the commanded signal to compensate for operational variables that influence needle member position. The closed loop feedback can be employed to make adjustments to the needle member position so that measured position closely approximates the desired position. Accordingly, the disclosed method can be used to improve manufacturability and to reduce costs of directly actuated fuel injection valves.

With this embodiment of the method, the fuel can be supplied in the gaseous phase, and the same range of fuels can be injected, and the method can further comprise amplifying the mechanical movement with the transmission device. This embodiment can also employ the same control strategies that have been described with reference to other embodiments disclosed herein.

BRIEF DESCRIPTION OF THE DRAWING(S)

FIG. 3 shows a schematic section view of a second embodiment of a common rail directly actuated fuel injection valve that has a needle member that retracts inwards and away from the nozzle to an open position.

FIG. 4 shows an enlarged section view of a portion of the second embodiment shown in FIG. 3, with this view showing a better view of the hydraulic fluid reservoir and a pressure regulating device for using fuel pressure to pressurize the hydraulic fluid.

FIG. 5 shows an enlarged section view of a portion of the second embodiment shown in FIGS. 3 and 4, showing a hydraulic transmission device that comprises a hydraulic displacement amplifier that is fluidly sealed from the fuel.

DETAILED DESCRIPTION OF PREFERRED EMBODIMENT(S)

Figure 2:
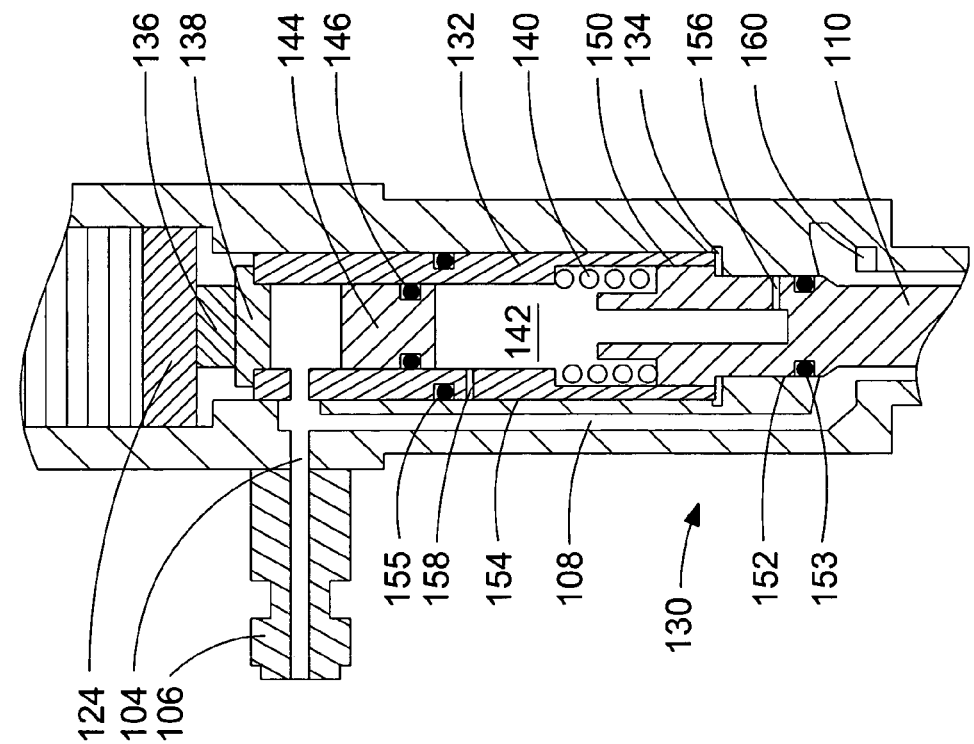
FIG. 2 shows an enlarged section view of a portion of the apparatus of FIG. 1, showing a hydraulic transmission device that comprises a hydraulic displacement amplifier that is fluidly sealed from the fuel.
Figure 1:
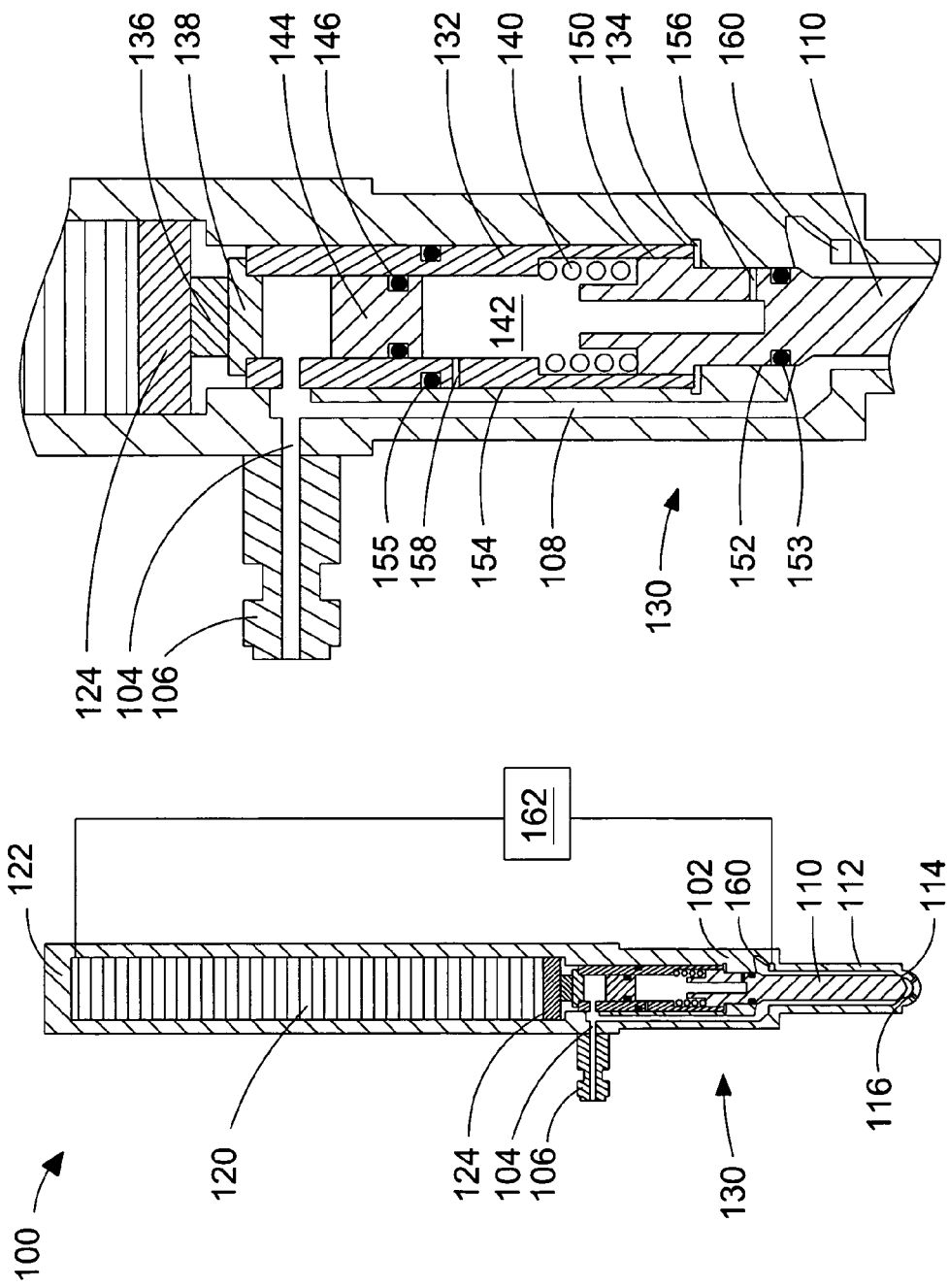
FIG. 1 shows a schematic section view of a common rail directly actuated fuel injection valve that has a needle member that retracts inwards and away from the nozzle to an open position.

FIG. 1 and the enlarged view of FIG. 2 are schematic cross-sectional views of a preferred embodiment of a common rail directly actuated fuel injection valve. Fuel injection valve 100 is described in detail hereinafter with reference to FIGS. 1 and 2.

Valve body 102 can be formed by joining a plurality of pieces to facilitate the manufacturability of valve 100. Valve body 102 comprises a fuel inlet 104 through which fuel can be introduced into valve body 102. Coupling 106 is connectable to a fuel supply system (not shown) and provides an opening and a conduit through which fuel can be directed to fuel inlet 104.

As better shown in the enlarged view of FIG. 2, fuel cavity 108 is defined by valve body 102 and is in fluid communication with fuel inlet 104. In this embodiment, fuel cavity 108 comprises fuel passages through valve body 102 through which fuel can flow from fuel inlet 104 to an annular space around valve needle 110 provided within nozzle 112. Valve needle 110 comprises a sealing surface disposed in nozzle 112 that can be pressed against valve seat 114 to maintain valve needle 110 in a closed position. In the closed position fuel is prevented from flowing through nozzle orifice(s) 116. When valve needle 110 is lifted away from valve seat 114, fuel can flow through the space between the sealing surface of valve needle 110 and valve seat 114 and out through nozzle orifice(s) 116.

Direct actuation is provided by an actuator that comprises a drive member 120 that can be activated to produce a mechanical strain. In the illustrated embodiment, drive member 120 is shown as a stack of piezoelectric elements, but drive member 120 can be made from other strain-type actuator materials such as a magnetostrictive or electrostrictive material. With the shown piezoelectric elements, a charge is applied to drive member 120 to cause a mechanical strain. If a magnetostrictive material is employed, an electric coil can be disposed around the drive member, and the electric coil can be energized to produce a magnetic field to cause a mechanical strain.

Drive member 120 is held between end cap 122 and base member 124. The mechanical strain produced by drive member 120 is transmitted to valve needle 110 through a hydraulic transmission device 130, which is best illustrated in the enlarged view of FIG. 2. In this embodiment, hydraulic transmission device 130 comprises plunger 132 and a transmission cavity defined by valve body 102, plunger 132, and valve needle 110.

Movements caused by the mechanical strain produced by drive member 120 are transmitted to plunger 132 through base member 124 and rigid connecting members 136 and 138.

Spring 140 is disposed between plunger 132 and valve needle 110 to bias the needle in the closed position. Spring 140 also acts to urge plunger 132 towards drive member 120 so that no gaps form between plunger 132, connecting members 136 and 138, base member 124, and drive member 120. In the illustrated embodiment plunger 132 is hollow to house spring 140 and also to define a cavity that serves as reservoir 142. One end of reservoir 142 is capped by movable piston 144, which has one side facing fuel cavity 108 and an opposite side facing reservoir 142. In this embodiment reservoir 142 is filled with the same hydraulic fluid that is employed to fill transmission cavity 134. In preferred embodiments, reservoir 142 is sized to hold a quantity of hydraulic fluid, such that, under normal operating conditions, there is an ample supply of hydraulic fluid for the expected service life of the fuel injection valve.

Seal 146 prevents fuel from leaking by piston 144 and into reservoir 142. In this embodiment, because piston 144 has opposing sides that have equal areas, piston 144 is movable to an equilibrium position to maintain substantially equal pressures in the fuel cavity and the reservoir. By equalizing these pressures, the seal arrangement can be simplified and leakage between the fuel cavity and the reservoir can be reduced. As will be shown in the embodiment off FIGS. 3 through 5, the piston can have an area that faces the reservoir that is smaller than the area that faces the fuel cavity so that pressure within the reservoir is higher than the pressure in the fuel cavity; a small pressure gradient can be desirable to guard against fuel leakage into the reservoir and hydraulic transmission device, without creating a pressure differential that is large enough to cause excessive leakage of hydraulic fluid into the fuel cavity.

Reservoir 142 is in restricted fluid communication with transmission cavity 134 by way of gap 150 between the adjacent surfaces of plunger 132 and valve needle 110, in addition to gap 152 between the adjacent surfaces of valve body 102 and valve needle 110, and gap 154 between valve body 102 and plunger 132. Hydraulic fluid that does flow into gap 152 is prevented from leaking into fuel cavity 108 by seal 153 and conduit 156 allows fluid communication between gap 152 and reservoir 142 so that a differential pressure does not build against seal 153 and hydraulic fluid that has flowed into gap 152 can be recovered back to reservoir 142. Similarly, hydraulic fluid that does flow into gap 154 is prevented from leaking into fuel cavity 108 by seal 155 and conduit 158 allows fluid communication between gap 154 and reservoir 142 so that a differential pressure does not build against seal 155 and hydraulic fluid that has flowed into gap 154 can be recovered back to reservoir 142.

For the embodiments of the disclosed fuel injection valve, smaller gaps reduce fluid flowability between the transmission cavity and the reservoir to improve the stiffness of the hydraulic transmission device when the valve is actuated. However, the gaps must be large enough facilitate assembly and movement during operation without binding, and to preferably to allow some flow between injection events to allow for functionality as a compensator for changes in the dimensional relationship between components. Generally, the clearance gaps can be less than 50 microns and preferably less than 25 microns with some clearance gaps being as small as 2–3 microns. The hydraulic flow in the clearance gap is governed by the Hagen-Poiseuille Flow and the hydraulic fluid and clearance gap are preferably selected so that the flow of hydraulic fluid through the gap is insignificant during the time span of fuel injection events when an opening force is transmitted through the hydraulic fluid.

To further assist with injection valve needle position control, a preferred embodiment comprises sensor 160 disposed in valve body 102 proximate to valve needle 110. Sensor 160 measures the position of valve needle 110 and sends a signal representative of that position to controller 162. There are many known types of sensors that are suitable for measuring the position of valve needle 110. For example, sensor 160 can be a magnetic or optical sensor. Controller 162 can also receive signals from other instruments that are indicative of other operating parameters that are relevant to determining the desired needle position to control the fuel mass flow rate into the engine's combustion chamber. For example, other operating parameters include in-cylinder pressure and temperature, intake manifold temperature, timing for start of combustion, and engine speed. Such operating parameters can be measured directly or indirectly. Controller 162 is programmable to process these signals and can output a signal to the fuel injection valve actuator to adjust the commanded needle position accordingly, for example, with reference to an engine map, a look-up table, a local map, or a model. A number of control methods that employ sensor 160 are described in greater detail below with reference to FIGS. 8 through 10.

The fuel injection valve of FIGS. 1 and 2 can be operated as described hereinafter. Injection valve 100 is closed between injection events when drive member 120 is not activated and spring 140 holds valve needle 110 in the closed position. To open injection valve 100 and start an injection event, controller 162 commands the actuator to activate drive member 120. Depending upon the operating conditions and the commanded load, controller 162 determines the desired valve needle lift for the injection event. With the disclosed directly actuated fuel injection valve, valve needle 110 can be controlled to follow a predetermined waveform to shape the fuel mass flow rate into the combustion chamber to achieve the desired combustion characteristics.

When drive member 120 is activated, movement is transmitted through base member 124 and rigid members 136 and 138 causing plunger 132 to move in the direction of valve needle 110. Plunger 132 has an end disposed in transmission cavity 134 that displaces hydraulic fluid as it advances therein. Because the duration of a fuel injection event is relatively short (typically on the order of 500–5000 microseconds), there is not enough time for a significant amount of hydraulic fluid to flow through gaps 150, 152 and 154 during an injection event. Ideally no fluid flows from transmission cavity 134 to reservoir 142 during a fuel injection event. To accommodate the displaced hydraulic fluid within transmission cavity 134, valve needle 110 moves in a direction that is opposite to that of plunger 132, thereby lifting the sealing surface of valve needle 110 away from valve seat 114. Valve needle 110 can also be provided with a shoulder surface in fuel cavity 108 so that fuel pressure acting on the shoulder can also help to open the valve.

At the end of the injection event, drive member 120 is de-activated and plunger 132 moves back in the direction of drive member 120, and valve needle 110 moves back towards the nozzle tip until it is seated against valve seat 114. Compared to the duration of the fuel injection events, the duration of the time between injection events is relatively long (for example, typically at least 40 milliseconds for an engine when operating at 3000 rpm). During these times between injection events, hydraulic fluid can flow through the gaps that permit restricted flow between transmission cavity 134 and reservoir 142.

For example, if differential thermal effects cause valve body 102 to expand more than drive member 120, the volume of transmission cavity 134 can increase, causing the pressure therein to decrease. Because the hydraulic fluid within reservoir 142 is pressurized, this helps with fluid flow from reservoir 142 through the gaps, to ensure that transmission cavity 134 is always filled with hydraulic fluid and to also prevent cavitation from occurring by maintaining a fluid pressure that is well above the vapor pressure of the hydraulic fluid. Similarly, if the volume of transmission cavity 134 decreases, causing a higher pressure to develop therein, hydraulic fluid can flow through the gaps in the other direction from transmission cavity 134 to reservoir 142. Thermal effects, wear, and other factors can all contribute to dimensional changes during the operational life of the fuel injection valve and the flow of pressurized hydraulic fluid back and forth between reservoir 142 and transmission cavity 134 can help to compensate for such dimensional changes.

When an engine is shut off, it provides an additional opportunity for periodic adjustments to occur by providing a longer time for hydraulic fluid to flow between the reservoir and the transmission chamber.

As already mentioned, a number of features are provided to prevent leakage of the hydraulic fluid into fuel cavity 108. Reservoir 142 and transmission cavity 134 are fluidly sealed from fuel cavity 108 by seals 146, 153 and 155 and the pressurization of the hydraulic fluid within reservoir 142 helps to prevent a high pressure differential across the seals. However, during the service life of fuel injection valve 100, plunger 132 and valve needle 110 may be actuated millions of times and some leakage of hydraulic fluid into fuel cavity 108 is inevitable. Reservoir 142 is initially filled with hydraulic fluid so that over the service life of injection valve 100, piston 144 is movable to reduce the volume of reservoir 142 to maintain the pressure of the hydraulic fluid while compensating for a reasonable amount of leakage and providing an ample reserve of hydraulic fluid for keeping transmission cavity 134 filled.

FIGS. 3 through 5 show schematic cross-sectional views of another embodiment of a common rail directly actuated fuel injection valve. In this embodiment, fuel injection valve 300 comprises valve body 302, which defines fuel inlet 304, fuel cavity 308, and reservoir 342. As in other embodiments, valve body 302 can be formed by joining a plurality of pieces to facilitate the manufacturability of valve 300. Coupling 306 is connectable to a fuel supply system (not shown) and provides an opening and a conduit through which fuel can be directed to fuel inlet 304.

Fuel cavity 308 is defined by valve body 302 and comprises fuel passages through valve body 302 through which fuel can flow from fuel inlet 304 to an annular space around valve needle 310 provided within nozzle 312. Valve needle 310 comprises a sealing surface disposed in nozzle 312 that can be pressed against valve seat 314 to maintain valve needle 310 in a closed position. In the closed position fuel is prevented from flowing through nozzle orifice(s) 316. When valve needle 310 is lifted away from valve seat 314, fuel can flow through the space between the sealing surface of valve needle 310 and valve seat 314 and out through nozzle orifice(s) 316.

Direct actuation is provided by an actuator that comprises a drive member 320 that can be activated to produce a mechanical strain. In the illustrated embodiment, drive member 320 is shown as a stack of piezoelectric elements, but drive member 320 can be made from other strain-type actuator materials such as a magnetostrictive or electrostrictive material. With the shown piezoelectric elements, a charge is applied to drive member 320 to cause a mechanical strain. If a magnetostrictive material is employed, an electric coil can be disposed around the drive member, and the electric coil can be energized to produce a magnetic field to cause a mechanical strain.

Drive member 320 is held between end cap 322 and base member 324. The mechanical strain produced by drive member 320 is transmitted to valve needle 310 through a hydraulic transmission device 330 shown generally in FIG. 3, but best illustrated in the enlarged views of FIGS. 4 and 5. In this embodiment, hydraulic transmission device 330 comprises plunger 332 and transmission cavity 334 defined by valve body 302, plunger 332, and valve needle 310.

Movements caused by the mechanical strain produced by drive member 320 are transmitted to plunger 332 through base member 324.

Spring 340 is disposed between the inner end of valve needle 310 and valve body 302 to bias the valve needle 310 in the closed position. Spring 341 can be employed to urge plunger 332 towards drive member 320 so that no gaps form between plunger 332, base member 324, and drive member 320. In the illustrated embodiment plunger 332 is a solid piston.

One end of reservoir 342 is capped by movable piston 344, which has one side facing fuel cavity 308 and the opposite side facing reservoir 342. Reservoir 342 is filled with the same hydraulic fluid that is employed to fill transmission cavity 334. Like the other embodiments, reservoir 342 is preferably sized to hold a quantity of hydraulic fluid, such that, under normal operating conditions, there is an ample supply of hydraulic fluid for the expected service life of the fuel injection valve.

In this embodiment, piston 344 is shown with a surface area facing fuel cavity 308 that is larger than the surface area that faces reservoir 342 so that the pressure within reservoir 342 is pressurizable to a higher pressure than the fuel pressure. Seal 346 prevents hydraulic fluid from leaking by piston 344 and into fuel cavity 308.

Reservoir 342 is in restricted fluid communication with transmission cavity 334 mainly by way of gap 350 between the adjacent surfaces of valve body 302 and valve needle 310, and also by way of gap 352 between a second pair of adjacent surfaces of valve body 302 and valve needle 310, and gap 354 between valve body 302 and plunger 332. Hydraulic fluid that flows into gap 352 is prevented from leaking into fuel cavity 308 by seal 353 and conduit 356 allows fluid communication between gap 352 and reservoir 342 so that a differential pressure does not build against seal 353 and hydraulic fluid that flows into gap 352 can be recovered back to reservoir 342. Similarly, hydraulic fluid that flows into gap 354 is prevented from leaking into fuel cavity 308 by seal 355 and conduit 358 allows fluid communication between gap 354 and reservoir 342 so that a differential pressure does not build against seal 355 and hydraulic fluid that flows into gap 354 can be recovered back to reservoir 342. In the illustrated embodiment, some of the gaps can be as provided by clearance fits between components of less than 3 microns. When an apparatus employs a plurality of clearance fits between components, for manufacturing and operating reasons, it is necessary to make some of the clearance fits larger (for example, 25–50 microns). In the embodiment illustrated in FIGS. 3 through 5, gap 350 is preferably larger than gaps 352 and 354 because fluid flowing through gap 350 flows directly between reservoir 342 and one of the chambers of transmission cavity 334.

To further assist with injection valve needle position control, fuel injection valve 300 preferably further comprises sensor 360 disposed in valve body 302 proximate to valve needle 310. Sensor 360 measures the position of valve needle 310 and sends a signal representative of that position to controller 362. Controller 362 can also receive signals from other instruments that are indicative of other operating parameters that are relevant to determining the desired needle position to control the fuel mass flow rate into the engine's combustion chamber. Controller 362 is programmable to process these signals and can output a signal to the fuel injection valve actuator to adjust the commanded needle position accordingly.

Although the arrangement of fuel injection valve 300 is different from fuel injection valve 100, both valves function in essentially the same manner. However, with fuel injection valve 300, transmission cavity 334 comprises a first chamber associated with plunger 332 and a second chamber associated with valve needle 310. The first and second chambers are fluidly connected by conduit 335. When drive member 320 is energized, plunger 332 is pushed down into the first chamber of transmission cavity 334, displacing hydraulic fluid therefrom and into the second chamber via conduit 335. The volume of the second chamber expands by forcing valve needle 310 upwards, thereby lifting valve needle 310 away from valve seat 314 to allow fuel to flow from fuel injection valve 300 through orifice(s) 316.

For consistency of operation, the hydraulic fluid is preferably an extremely stable fluid that maintains its desired properties over a wide range of operating conditions (that is, within the expected operating conditions inside transmission cavity 334). One of the desired properties of the hydraulic fluid that is important to the operability of the disclosed hydraulic transmission devices is the hydraulic fluid's bulk modulus. For consistent operation under the range of operating conditions, the hydraulic fluid preferably has a bulk modulus that remains substantially constant in value over the normal operating conditions. The bulk modulus is sufficiently high to make the fluid substantially incompressible under normal valve operating conditions.

Another important property for the hydraulic fluid is its viscosity. Again, operability is improved by selecting a fluid with a more constant viscosity over the range of normal operating conditions. The viscosity of the hydraulic fluid influences the size of the clearance gaps that are provided between components since the gaps are sized to allow restricted fluid to flow between the reservoir and the transmission cavity during the time between injection events and substantially no flow during fuel injection events.

Suitable hydraulic fluids are, for example, conventional motor oil, such as grade 15W40, or synthetic lubricants such as Dupont® "Krytox®" grease which is available in a range of viscosities. Krytox® is a PerFluoroPolyEther (PFPE) synthetic lubricant that may be mixed with a thickener to form a grease. These types of hydraulic fluids can also help to lubricate the seals associated with the gaps. An advantage of the disclosed fuel injection valve is that the hydraulic fluid is different from the fuel so a hydraulic fluid can be selected that has the most suitable properties for the operation of the hydraulic transmission device. Because the hydraulic fluid is different from the fuel, the disclosed fuel injection valve is especially suitable for injecting fuels that are in the gaseous phase, compared to known fuel injection valves that use a liquid fuel to fill the hydraulic transmission device.

Figure 7:
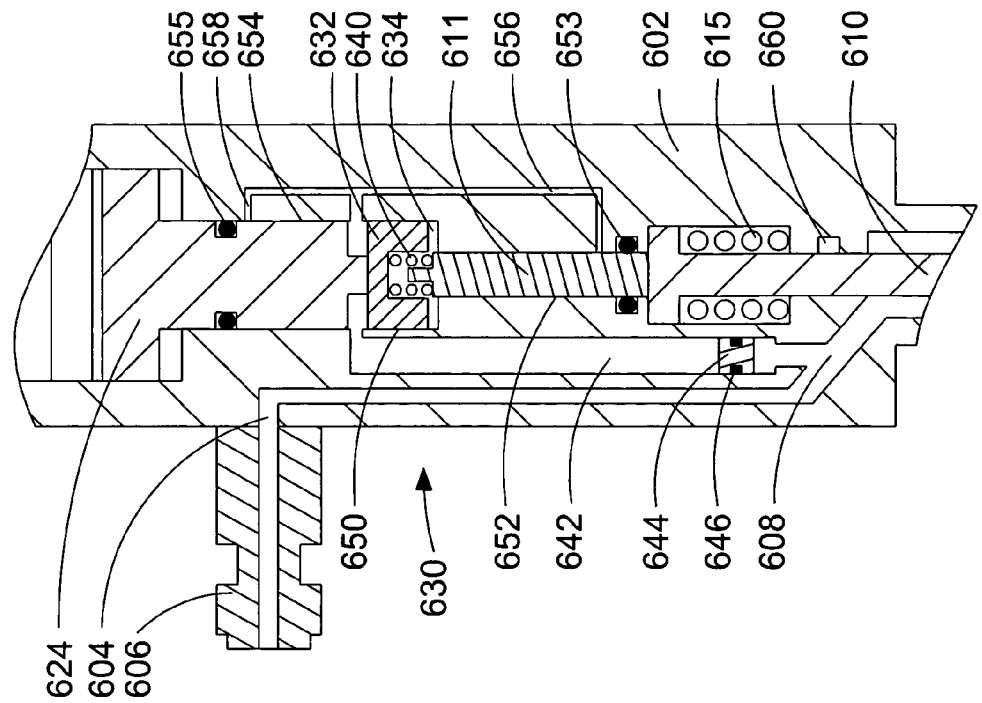
FIG. 7 shows an enlarged section view of the hydraulic transmission device of the third embodiment shown in FIG. 6.
Figure 6:
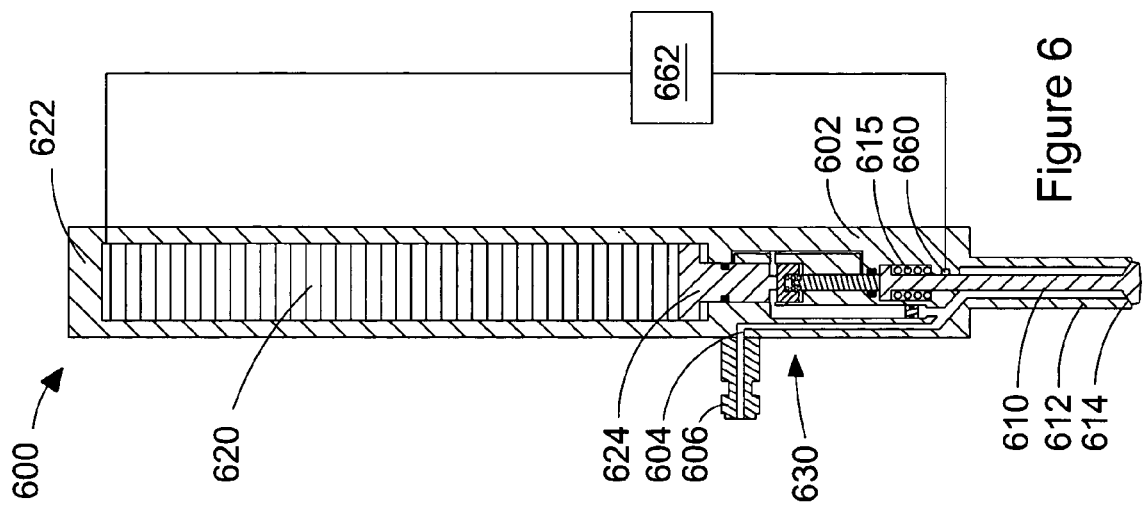
FIG. 6 shows a schematic section view of a third embodiment of a common rail directly actuated fuel injection valve. This type of injection valve is known as a poppet style injection valve because it has an outward opening valve member.

FIGS. 6 and 7 show schematic cross sectional views of a third embodiment of a common rail directly actuated fuel injection valve that has an outward opening needle. Fuel injection valve 600 comprises valve body 602, which defines fuel inlet 604, fuel cavity 608, and reservoir 642. Coupling 606 is connectable to a fuel supply system (not shown) and provides an opening and a conduit through which fuel can be directed to fuel inlet 604.

Fuel cavity 608 is in fluid communication with fuel inlet 604 and comprises fuel passages through valve body 602 through which fuel can flow from fuel inlet 604 to an annular space around valve needle assembly 610 provided within nozzle 612. Valve needle assembly 610 comprises a sealing surface disposed opposite valve seat 614 provided by a surface of nozzle 612. In the closed position fuel is prevented from flowing through nozzle 612. Spring 615 is disposed between a shoulder area provided by valve body 602 and a flange of valve needle assembly 610. Spring 615 biases valve needle assembly 610 in the closed position. When valve needle assembly 610 moves outward from valve body 602 against the bias of spring 615, it is lifted away from valve seat 614, and fuel can flow through the space between the sealing surface of valve needle assembly 610 and valve seat 614.

Direct actuation is provided by an actuator that comprises drive member 620 that can be activated to produce a mechanical strain. In the illustrated embodiment, drive member 620 is shown as a stack of piezoelectric elements. With the shown piezoelectric elements, a charge is applied to drive member 620 to cause a mechanical strain.

Drive member 620 is held between end cap 622 and base member 624. The mechanical strain produced by drive member 620 is transmitted to valve needle assembly 610 through a hydraulic transmission device 630 shown generally in FIG. 6, but best illustrated in the enlarged view of FIG. 7. In this embodiment, hydraulic transmission device 630 comprises plunger 632 and transmission cavity 634 defined by valve body 602, plunger 632, and transmission member 611 of valve needle assembly 610.

Movements caused by the mechanical strain produced by drive member 620 are transmitted to plunger 632 through base member 624.

Spring 640 is disposed between the upper end of transmission member 611 and plunger 632 to urge plunger 632 towards drive member 620 so that no gaps form between plunger 632, base member 624, and drive member 620. Spring 640 is weaker than spring 615 so that valve needle assembly remains biased in the closed position when drive member 620 is not activated.

One end of reservoir 642 is capped by movable piston 644, which has one side facing fuel cavity 608 and the opposite side facing reservoir 642. Reservoir 642 is filled with the same hydraulic fluid that is employed to fill transmission cavity 634. Piston 644 is movable to an equilibrium position by fuel pressure in fuel cavity 608 so that the hydraulic fluid is pressurized.

In this embodiment, piston 644 is shown with a surface area facing fuel cavity 608 that is equal to the surface area that faces reservoir 642 so that the pressure within reservoir 642 is equalized with the fuel pressure. Seal 646 prevents fluid leakage by piston 644.

Reservoir 642 is in restricted fluid communication with transmission cavity 634 mainly by way of gap 650 between the adjacent surfaces of valve body 602 and plunger 632, and also by way of gap 652 between valve body 602 and transmission member 611. Hydraulic fluid that flows into gap 652 is prevented from leaking into fuel cavity 608 by seal 653 and conduit 656 allows fluid communication between gap 652 and reservoir 642 so that a differential pressure does not build against seal 653 and hydraulic fluid that flows into gap 652 can be recovered back to reservoir 642. Hydraulic fluid that flows into gap 654 is prevented from leaking into the actuator chamber by seal 655, and conduit 658 allows fluid to be recovered to reservoir 642.

To further assist with injection valve needle position control, fuel injection valve 600 preferably further comprises sensor 660 disposed in valve body 602 proximate to valve needle 610. Sensor 660 measures the position of valve needle 610 and sends a signal representative of that position to controller 662. Controller 662 can also receive signals from other instruments that are indicative of other operating parameters that are relevant to determining the desired needle position to control the fuel mass flow rate into the engine's combustion chamber. Controller 662 is programmable to process these signals and can output a signal to the fuel injection valve actuator to adjust the commanded needle position accordingly.

In operation, fuel injection valve 600 functions in a similar manner to the other disclosed embodiments. When drive member 620 is activated it pushes plunger 632 into transmission cavity 634 causing valve needle assembly 610 to move in the same direction to expand the volume of transmission cavity 634 to accommodate the hydraulic fluid displaced by plunger 632. Because the cross sectional area of valve needle assembly 610 transverse to the direction of movement is smaller than the cross sectional area of plunger 632 transverse to its direction of movement the movement of valve needle assembly 610 is amplified over the movement of plunger 632. Fluid communication between reservoir 642 and transmission cavity 634 occurs in the same manner as in the other embodiments, as does pressurization of the hydraulic fluid by the fuel pressure.

The embodiments shown in FIGS. 1 through 7 are schematic views that illustrate the features of those embodiments. Those skilled in this technology will understand that the actual fuel injection valves built with these features may appear different without departing from the scope of the present disclosure. For example, in the embodiment of FIGS. 6 and 7, the vertically oriented fuel passage of fuel cavity 608 and reservoir 642 can be more ideally disposed in different segments of valve body 602 so that the diameter of reservoir 642 can be larger, and/or the diameter of the valve body can be made smaller.

FIGS. 8 through 11 are control diagrams that show different methods of using a valve needle position sensor to monitor and further control needle position. As mentioned above, while a movement caused by the actuator drive member causes a corresponding movement of the fuel injection valve needle, this movement is transmitted through a number of other components, including the hydraulic transmission device, and other mechanical linkage members, as well as the valve needle which can itself be an elongated member that can expand and contract when operating conditions change. Even if the fuel injection valve is equipped with a mechanical means for compensating for changes in the dimensional relationship between components, such as the hydraulic transmission device described herein, further means of adjustment may be beneficial if there are a large number of factors that can cause dimensional changes. For example, such factors can include transient differential temperature effects on components including the valve body itself, the effects of physical wear, or changes in the properties of materials caused by use over time. The method of operation can further comprise using a sensor to measure the injection valve needle position so that a controller can send signals to the actuator to correct for variances between measured and desired needle position.

Figure 8:
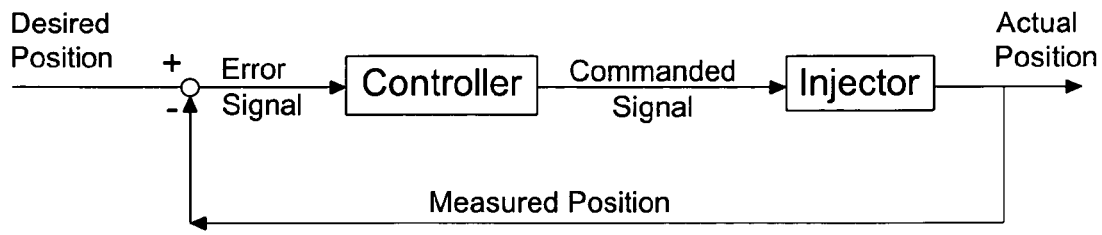
FIG. 8 shows a control block diagram for the disclosed fuel injection valve that uses closed loop feed back to assist with controlling the position of the valve needle.

FIG. 8 is a control block diagram that illustrates a closed loop feedback control strategy for controlling the position of a fuel injection valve needle. A sensor can be associated with the valve needle to measure its position, which a controller compares to the desired valve needle position. The desired needle position is determined by an engine controller with reference to a look-up table, which can be in the form of an engine map that stores predetermined desired needle positions for a given set of operating conditions. If there is no variance between the desired and measured needle positions then no error correction is required by the valve controller. However, if the measured needle position is different from the desired needle position, the valve controller sends a command signal to the valve actuator to correct the needle position. The response time needed to control the system determines the type of controller. Response time is determined according to the needs of the application. For example, with a high-speed controller it is possible to correct the position of the needle during a fuel injection event using measurements of the needle position that are collected from earlier in the same injection event so that the measured needle position can be corrected to follow a desired shape or characteristic. If such precise control is not needed, a lower speed controller can be employed to periodically compare measured needle position against desired needle position to make periodic corrections. For example, periodic corrections can be made using needle position measurements from the previous cycle, or a number of previous cycles if the characteristic being compared is an average taken over a predetermined number of cycles.

With the disclosed method, needle position is measured during an injection event and the controller can be programmed to use this information to determine characteristics of needle movement such as slopes, areas, maxima, inflections, and average position for each injection event, average position over a number of cycles, and compare the calculated characteristics based on the measured needle positions against the expected characteristics based on the desired needle positions. Then the controller can send a command signal to the actuator to activate it to make corrections based on the variance between the measured characteristics and the desired or expected characteristics. Persons skilled in this technology will understand that there must be one command signal parameter for each of the measured characteristic parameters used in closed loop control (effectively multiple control loops).

Figure 9:
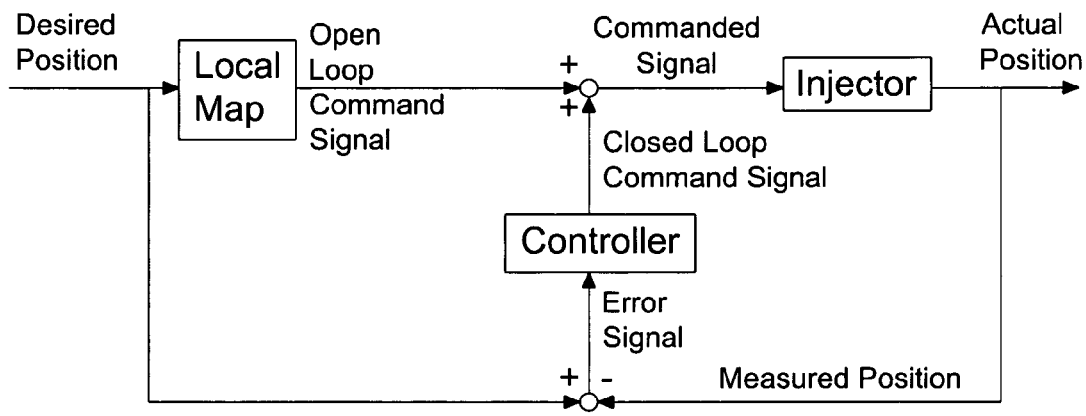
FIG. 9 shows a control block diagram for the disclosed fuel injection valve that uses combined feed forward/feed back control to assist with controlling the position of the valve needle.

FIG. 9 illustrates a control block diagram that uses feed forward combined with feed back control. This method employs some of the elements of the control block diagram of FIG. 8, in that closed loop feedback is employed to correct valve needle position. An engine controller is still employed to determine a desired valve needle position. The desired needle position is sent to a local map that converts the desired position to a command signal that is sent to the injection valve actuator. The desired needle position is also compared to the signal from the sensor that is representative of the measured needle position. If there is a variance between the desired needle position and the measured needle position an error signal is sent to the injection valve controller and an adjustment is made to the command signal that is sent to the injection valve actuator.

Figure 10:
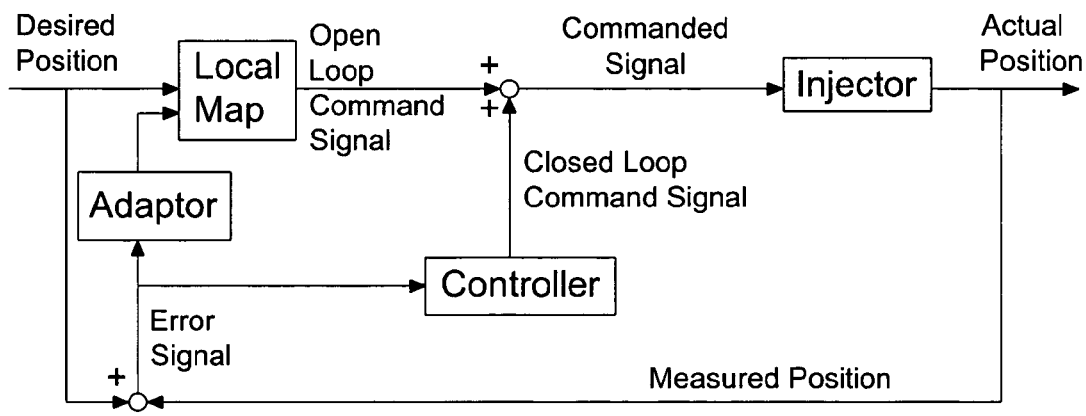
FIG. 10 shows a control block diagram for the disclosed fuel injection valve that uses an adaptive control strategy to assist with controlling the position of the valve needle.

The local map shown in FIGS. 9 and 10 can be multi-dimensional and responsive to a plurality of engine operating parameters. In another embodiment, the local map can be replaced with a model that is capable of representing more complex relationships. A model based controller can be used to make discrete decisions that a multi-dimensional map can not represent.

FIG. 10 illustrates a control block diagram that uses an adaptive controller combined with the feed back and feed forward features of FIG. 9. Like the other embodiments, the desired needle position is determined by an engine controller. Like the embodiment of FIG. 9, if a variance between the desired needle position and the measured representative needle position is detected, an error signal is sent to the injection valve controller and an adjustment is made to the command signal to the fuel injection valve actuator. However, in this embodiment, the error signal can also be sent to an adaptor that can make adjustments to the local map. The closed loop control can operate with a different update loop time than the adaptive control circuit. For example the closed loop control can operate with a faster update rate than the adaptive control circuit, so that the local map is not adapted as frequently. In this example, fewer changes are made to the local map for transient effects, and changes are more likely to compensate for progressive changes in the dimensional relationship between components, that could be caused, for example, by wear.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A common rail directly actuated fuel injection valve comprises:
   (a) a valve body that defines a fuel inlet and a fuel cavity in communication with said fuel inlet;
   (b) a valve member movable within said valve body between a closed position at which said valve member is in sealed contact with a valve seat to hold fuel within said fuel cavity, and at least one open position at which said valve member is spaced apart from said valve seat to allow said fuel to flow from said fuel cavity and out of said fuel injection valve;
   (c) an actuator comprising a drive member that is controllable to produce a mechanical strain in said drive member;
   (d) a reservoir disposed within said valve body and filled with a hydraulic fluid, wherein said reservoir is fluidly sealed from said fuel cavity;
   (e) a hydraulic transmission device associated with said actuator and said valve member, said hydraulic transmission device comprising a transmission cavity filled with said hydraulic fluid for transmitting said mechanical movement from said drive member to said valve member, wherein said transmission cavity is in restricted fluid communication with said reservoir whereby hydraulic fluid can flow between said reservoir and said transmission cavity when said valve member is in said closed position and no substantial hydraulic fluid flows between said reservoir and said transmission cavity when said valve member is in an open position; and
   (f) a pressure regulating device disposed within said valve body between said fuel cavity and said reservoir, whereby hydraulic fluid within said reservoir is pressurizable by fuel pressure within said fuel cavity.

2. The fuel injection valve of claim 1 wherein said pressure regulating device comprises a displaceable member disposed between said fuel cavity and said reservoir.

3. The fuel injection valve of claim 2 wherein said displaceable member is a piston movable within a cylinder with respective opposite ends of said piston associated with said fuel cavity and said reservoir.

4. The fuel injection valve of claim 3 further comprising a seal between said piston and said cylinder.

5. The fuel injection valve of claim 4 wherein said seal comprises at least one O-ring seal.

6. The fuel injection valve of claim 3 wherein said opposite ends of said piston have equal surface areas.

7. The valve of claim 3 wherein said piston has an end associated with said fuel cavity that has a larger surface area than the opposite end that is associated with said reservoir.

8. The fuel injection valve of claim 1 further comprising a sensor associated with said valve member, said sensor operable to measure the position of said valve member and to send a signal to a controller and wherein said controller is operable to process said signal to determine the difference between the measured position of said valve member and the desired position and then correct a command signal to said actuator to move said valve member toward said desired position.

9. The fuel injection valve of claim 1 wherein said hydraulic transmission device further comprises a plunger operatively associated with said drive member, wherein said mechanical strain caused by activation of said actuator results in a corresponding movement of said plunger, said plunger having an end that is disposed within said transmission cavity whereby movements of said plunger change the volume of hydraulic fluid that is displaced by said plunger, and wherein said valve member or a transmission member operatively associated with said valve member has an end disposed in said transmission cavity and said valve member or said transmission member is movable to change the volume of hydraulic fluid that is displaced by same, whereby the volume of fluid within said transmission cavity is held substantially constant while said actuator is activated.

10. The fuel injection valve of claim 9 wherein at least some of said restricted fluid communication between said reservoir and said transmission cavity is provided by one of (i) a gap between said plunger and valve member and (ii) a gap between said plunger and said transmission member.

11. The fuel injection valve of claim 9 wherein at least some of said restricted fluid communication between said reservoir and said transmission cavity is provided by a gap between said plunger and said valve body.

12. The fuel injection valve of claim 9 wherein at least some of said restricted fluid communication between said reservoir and said transmission cavity is provided by one of (i) a gap between said valve member and said valve body and (ii) a gap between said transmission member and said valve body.

13. The fuel injection valve of claim 12 further comprising at least one conduit disposed within said valve body fluidly connecting a surface associated with one of said gaps with said reservoir.

14. The fuel injection valve of claim 9 further comprising respective gaps between said valve body and said plunger and said valve member and respective seals to prevent leakage of said hydraulic fluid into said fuel cavity through said respective gaps.

15. The fuel injection valve of claim 9 wherein said plunger has an end face opposite and equal in area to an end face of said valve member or said transmission member and said two end faces are disposed in said transmission cavity and spaced apart from each other.

16. The fuel injection valve of claim 9 wherein said plunger has an area transverse to its direction of movement that defines the volume that is displacable by movement of said plunger which is greater than an area of said valve member or said transmission member that is transverse to its respective direction of movement, and that defines the volume that is displacable by movement of said valve member or said transmission member.

17. The fuel injection valve of claim 9 wherein a spring is disposed between said plunger and said valve member or said transmission member for urging said plunger towards said drive member and biasing said valve member in said closed position.

18. The fuel injection valve of claim 1 wherein said hydraulic fluid is selected from the group consisting of motor oils, greases, and synthetic lubricants.

19. The fuel injection valve of claim 1 wherein said hydraulic fluid has a bulk modulus that is substantially constant under normal operating conditions within said transmission cavity.

20. The fuel injection valve of claim 1 wherein said hydraulic fluid has a viscosity that is substantially constant under normal operating conditions within said transmission cavity and said reservoir.

21. The fuel injection valve of claim 1 wherein said fuel is a gaseous fuel.

22. The fuel injection valve of claim 21 wherein said gaseous fuel is selected from the group consisting of natural gas, methane, ethane, liquefied petroleum gas, lighter flammable hydrocarbon derivatives, hydrogen, and blends thereof.

23. The fuel injection valve of claim 1 wherein said fuel is injectable from said fuel injection valve through a nozzle and directly into a combustion chamber of an internal combustion engine.

24. The fuel injection valve of claim 1 wherein said valve member is an inward opening valve needle whereby it moves in the direction of said actuator when moving from said closed position to an open position.

25. The fuel injection valve of claim 1 wherein said drive member is a transducer that is selected from the group consisting of magnetostrictive, piezoelectric and electrostrictive transducers.

26. The fuel injection valve of claim 1 wherein said hydraulic transmission device is a hydraulic displacement amplifier that amplifies said mechanical strain produced by the drive member to cause a movement of said valve member that is greater than said mechanical strain.

27. The fuel injection valve of claim 1 wherein fluid passages through which said restricted fluid flow is possible are sized to accommodate a flowrate that ensures said transmission cavity is always filled with hydraulic fluid.

28. A common rail directly actuated fuel injection valve comprises:
(a) a valve body that defines a fuel inlet, a fuel cavity in communication with said fuel inlet, and a reservoir filled with a hydraulic fluid and wherein said reservoir is fluidly sealed from said fuel cavity;
(b) a nozzle associated with one end of said valve body;
(c) a valve member movable within said valve body between a closed position at which said valve member is in contact with a valve seat to prevent fuel from flowing from said fuel cavity through said nozzle, and at least one open position at which said valve member is spaced apart from said valve seat to allow said fuel to flow through said nozzle;
(d) an actuator comprising a drive member that is controllable to produce a mechanical strain in said drive member;
(e) a hydraulic displacement amplifier comprising:
(1) a plunger operatively associated with said drive member and extendable into an amplification chamber that is filled with a hydraulic fluid; and
(2) a movable transmission member associated with said valve member and extendable into said amplification chamber, wherein said transmission member has an area transverse to its respective direction of movement that is smaller than an area of said plunger that is transverse to its respective direction of movement and wherein said amplification chamber is in restricted fluid communication with said reservoir whereby hydraulic fluid is flowable between said reservoir and said amplification chamber when said valve member is in said closed position, and because of the relative shortness of the duration of an injection event, no substantial amount of hydraulic fluid is flowable between said reservoir and said amplification chamber when said valve member is in an open position; and
(f) a pressure regulating device disposed within said valve body between said fuel cavity and said reservoir, whereby hydraulic fluid within said reservoir is pressurizable by fuel pressure within said fuel cavity.

29. The fuel injection valve of claim 28 wherein said pressure regulating device comprises a displaceable member disposed between said fuel cavity and said reservoir.

30. The fuel injection valve of claim 29 wherein said displaceable member is a piston movable within a cylinder with respective opposite ends of said piston associated with said fuel cavity and said reservoir.

31. The fuel injection valve of claim 30 further comprising a seal between said piston and said cylinder.

32. The fuel injection valve of claim 31 wherein said seal comprises at least one O-ring seal.

33. The fuel injection valve of claim 30 wherein said opposite ends of said piston have equal surface areas.

34. The valve of claim 30 wherein said piston has an end associated with said fuel cavity that has a larger surface area than the opposite end that is associated with said reservoir.

35. The fuel injection valve of claim 28 further comprising a sensor associated with said valve member, said sensor operable to measure the position of said valve member and to send a signal to a controller and wherein said controller is operable to process said signal to determine the difference between the measured position of said valve member and the desired position and then correct a command signal to said actuator to move said valve member toward said desired position.

36. The fuel injection valve of claim 28 wherein at least some of said restricted fluid communication between said reservoir and said amplification chamber is provided by a gap between said plunger and said valve member or said transmission member.

37. The fuel injection valve of claim 28 wherein at least some of said restricted fluid communication between said reservoir and said amplification chamber is provided by a gap between said plunger and said valve body.

38. The fuel injection valve of claim 28 wherein at least some of said restricted fluid communication between said reservoir and said amplification chamber is provided by a gap between said valve body and said valve member or said transmission member.

39. The fuel injection valve of one of claims 36 through 38 further comprising at least one conduit disposed within said valve body fluidly connecting a surface associated with one of said gaps with said reservoir.

40. The fuel injection valve of claim 28 further comprising respective gaps between said valve body and said plunger and said valve member and respective seals to prevent leakage of said hydraulic fluid into said fuel cavity through said respective gaps.

41. The fuel injection valve of claim 28 wherein a spring is disposed between said plunger and said transmission member for urging said plunger towards said drive member and biasing said valve member in said closed position.

42. The fuel injection valve of claim 28 wherein said hydraulic fluid is selected from the group consisting of motor oils, greases, and synthetic lubricants.

43. The fuel injection valve of claim 28 wherein said hydraulic fluid has a bulk modulus that is substantially constant under normal operating conditions within said amplification chamber.

44. The fuel injection valve of claim 28 wherein said hydraulic fluid has a viscosity that is substantially constant under normal operating conditions within said amplification chamber and said reservoir.

45. The fuel injection valve of claim 28 wherein said fuel is a gaseous fuel.

46. The fuel injection valve of claim 45 wherein said gaseous fuel is selected from the group consisting of natural gas, methane, ethane, liquefied petroleum gas, lighter flammable hydrocarbon derivatives, hydrogen, and blends thereof.

47. The fuel injection valve of claim 28 wherein said drive member is a transducer that is selected from the group consisting of magnetostrictive, piezoelectric and electrostrictive transducers.

48. The fuel injection valve of claim 28 wherein fluid passages through which said restricted fluid flow is possible are sized to accommodate a flowrate that ensures said amplification chamber is always filled with hydraulic fluid.

49. A common rail directly actuated fuel injection valve comprises:

(a) a valve body that defines a fuel inlet, a fuel cavity in communication with said fuel inlet;
(b) a nozzle associated with one end of said valve body;
(c) a valve member movable within said valve body between a closed position at which said valve member is in contact with a valve seat to prevent fuel from flowing from said fuel cavity through said nozzle, and at least one open position at which said valve member is spaced apart from said valve seat to allow said fuel to flow through said nozzle;
(d) an actuator comprising a drive member that is controllable to produce a mechanical strain in said drive member;
(e) a reservoir disposed within said valve body and filled with a hydraulic fluid, wherein said reservoir is fluidly sealed from said fuel cavity;
(f) a hydraulic displacement amplifier disposed between said valve member and said actuator, said hydraulic displacement amplifier comprising an amplification chamber that is in restricted fluid communication with said reservoir; and
(g) a pressure regulating device whereby fuel pressure within said fuel cavity can be employed to pressurize hydraulic fluid disposed within said reservoir.

50. The fuel injection valve of claim 49 wherein said pressure regulating device comprises a displaceable member disposed between said fuel cavity and said reservoir.

51. The fuel injection valve of claim 50 wherein said displaceable member is a piston movable within a cylinder with respective opposite ends of said piston associated with said fuel cavity and said reservoir.

52. The fuel injection valve of claim 51 further comprising a seal between said piston and said cylinder.

53. The fuel injection valve of claim 52 wherein said seal comprises at least one O-ring seal.

54. The fuel injection valve of claim 51 wherein said opposite ends of said piston have equal surface areas.

55. The valve of claim 51 wherein said piston has an end associated with said fuel cavity that has a larger surface area than the opposite end that is associated with said reservoir.

56. The fuel injection valve of claim 49 further comprising a sensor associated with said valve member, said sensor operable to measure the position of said valve member and to send a signal to a controller and wherein said controller is operable to process said signal to determine the difference between the measured position of said valve member and the desired position and then correct a command signal to said actuator to move said valve member toward said desired position.

57. The fuel injection valve of claim 49 wherein said hydraulic displacement amplifier comprises at least two displacement members that are extendable into said amplifier chamber to occupy and/or restore volume therein and at least some of said restricted fluid communication between said reservoir and said amplification chamber is provided by gaps between said displacement members and said valve body.

58. The fuel injection valve of claim 49 further comprising a spring operatively associated with said drive member and said valve member for engaging said hydraulic displacement amplifier with said drive member and biasing said valve member in said closed position.

59. The fuel injection valve of claim 49 wherein said hydraulic fluid is selected from the group consisting of motor oils, greases, and synthetic lubricants.

60. The fuel injection valve of claim 49 wherein said hydraulic fluid has a bulk modulus that is substantially constant under normal operating conditions within said amplification chamber.

61. The fuel injection valve of claim 49 wherein said hydraulic fluid has a viscosity that is substantially constant under normal operating conditions within said amplification chamber and said reservoir.

62. The fuel injection valve of claim 49 wherein said fuel is a gaseous fuel.

63. The fuel injection valve of claim 62 wherein said gaseous fuel is selected from the group consisting of natural gas, methane, ethane, liquefied petroleum gas, lighter flammable hydrocarbon derivatives, hydrogen, and blends thereof.

64. The fuel injection valve of claim 49 wherein said drive member is a transducer that is selected from the group consisting of magnetostrictive, piezoelectric and electrostrictive transducers.

65. A method of injecting fuel into an engine, said method comprising:
   supplying a fuel at injection pressure to a fuel cavity within a valve body;
   releasing fuel from said fuel cavity by moving a valve member to an open position by activating a strain-type actuator to produce a mechanical strain;
   transmitting a mechanical movement caused by said mechanical strain to a valve member through a hydraulic fluid that is fluidly isolated from said fuel; and
   using fuel pressure within said fuel cavity to pressurize said hydraulic fluid.

66. The method of claim 65 wherein said fuel that is supplied to said fuel cavity is in a gaseous phase.

67. The method of claim 65 wherein said fuel is selected from the group consisting of natural gas, methane, ethane, liquefied petroleum gas, lighter flammable hydrocarbon derivatives, hydrogen, and blends thereof.

68. The method of claim 65 further comprising amplifying said mechanical movement that is caused by said mechanical strain.

69. The method of claim 65 further comprising measuring the position of said valve member when said valve member is in said open position and sending a signal representative of the measured position to a controller and comparing said measured position to a desired position and generating an error signal to correct for the variance therebetween, and processing the error signal to generate a corrected commanded signal, which is sent to said actuator.

70. The method of claim 69 further comprising converting said desired needle position into an open loop command signal with a local map or model, and correcting said open loop command signal with a closed loop command signal that is generated from said error signal.

71. The method of claim 70 further comprising adapting said local map responsive to said error signal.

72. A method of injecting fuel into an engine, said method comprising:
   supplying a fuel at injection pressure to a fuel cavity within a valve body;
   releasing fuel from said fuel cavity by moving a valve member to an open position by activating a strain-type actuator to produce a mechanical strain;
   transmitting a mechanical movement caused by said mechanical strain to said valve member through a transmission device;
   measuring a position of said valve member when said valve member is in said open position to determine a measured position and sending a signal representative of said measured position to a controller; and
   comparing said measured position to a desired position and generating an error signal that is used by said controller to correct a commanded signal that said controller sends to said actuator.

73. The method of claim 72 wherein said fuel is selected from the group consisting of natural gas, methane, ethane, liquefied petroleum gas, lighter flammable hydrocarbon derivatives, hydrogen, and blends thereof.

74. The method of claim 72 further comprising amplifying said mechanical movement with said transmission device.

75. The method of claim 72 further comprising converting said desired needle position into an open loop command signal with a local map or model, and correcting said open loop command signal with a closed loop command signal that is generated from said error signal.

76. The method of claim 75 further comprising adapting said local map responsive to said error signal.

77. The method of claim 72 wherein said error signal that is employed to correct said commanded signal, is generated using a needle position measurement taken earlier in the same injection event.

78. The method of claim 72 wherein said error signal is compiled with previously calculated error signals to produce an average value that is used to correct said commanded signal.

* * * * *